United States Patent
Fan

(10) Patent No.: US 11,943,486 B2
(45) Date of Patent: *Mar. 26, 2024

(54) LIVE VIDEO BROADCAST METHOD, LIVE BROADCAST DEVICE AND STORAGE MEDIUM

(71) Applicant: Tencent Technology (Shenzhen) Company Limited, Shenzhen (CN)

(72) Inventor: Baocheng Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/122,535

(22) Filed: Mar. 16, 2023

(65) Prior Publication Data

US 2023/0224511 A1 Jul. 13, 2023

Related U.S. Application Data

(63) Continuation of application No. 17/534,255, filed on Nov. 23, 2021, now Pat. No. 11,632,576, which is a
(Continued)

(30) Foreign Application Priority Data

Nov. 29, 2016 (CN) .......................... 201611073970.X

(51) Int. Cl.
*H04N 21/24* (2011.01)
*H04N 21/2187* (2011.01)
(Continued)

(52) U.S. Cl.
CPC ... *H04N 21/2187* (2013.01); *H04N 21/23424* (2013.01); *H04N 21/2743* (2013.01);
(Continued)

(58) Field of Classification Search
None
See application file for complete search history.

(56) References Cited

U.S. PATENT DOCUMENTS

| 11,218,739 B2 | 1/2022 | Fan |
| 11,632,576 B2 | 4/2023 | Fan |

(Continued)

FOREIGN PATENT DOCUMENTS

| CN | 101365127 A | 2/2009 |
| CN | 103096134 A | 5/2013 |

(Continued)

OTHER PUBLICATIONS

Tencent Technology, ISRWO, PCT/CN2017/111535, Feb. 14, 2019, 3 pgs.

(Continued)

*Primary Examiner* — Brian T Pendleton
*Assistant Examiner* — Jean D Saint Cyr
(74) *Attorney, Agent, or Firm* — Morgan, Lewis & Bockius LLP

(57) ABSTRACT

The present disclosure provides a live video broadcast method performed by a terminal device. The method includes: receiving a live broadcast command to live broadcast a video game in real time, and creating a video buffer for the video game based on the live broadcast command; while playing the video game in real time, extracting video picture frames from the video game and storing them in the video buffer; collecting voice data by using a microphone of the terminal device, and synchronously synthesize the voice data and the video picture frames stored in the video buffer into a video streaming media file; and uploading the video streaming media file to a live broadcast server for live broadcasting the video streaming media file on other mobile devices.

15 Claims, 7 Drawing Sheets

Related U.S. Application Data continuation of application No. 16/351,267, filed on Mar. 12, 2019, now Pat. No. 11,218,739, which is a continuation of application No. PCT/CN2017/111535, filed on Nov. 17, 2017.

(51) Int. Cl.
| | |
|---|---|
| *H04N 21/234* | (2011.01) |
| *H04N 21/2743* | (2011.01) |
| *H04N 21/41* | (2011.01) |
| *H04N 21/414* | (2011.01) |
| *H04N 21/422* | (2011.01) |
| *H04N 21/43* | (2011.01) |
| *H04N 21/431* | (2011.01) |
| *H04N 21/44* | (2011.01) |
| *H04N 21/478* | (2011.01) |
| *H04N 21/4788* | (2011.01) |
| *H04N 21/81* | (2011.01) |

(52) U.S. Cl.
CPC . *H04N 21/41407* (2013.01); *H04N 21/42203* (2013.01); *H04N 21/4316* (2013.01); *H04N 21/44004* (2013.01); *H04N 21/44016* (2013.01); *H04N 21/4781* (2013.01); *H04N 21/4788* (2013.01); *H04N 21/816* (2013.01)

(56) References Cited

U.S. PATENT DOCUMENTS

| | | | |
|---|---|---|---|
| 2006/0242676 A1* | 10/2006 | Hoshino | H04N 7/24 725/105 |
| 2010/0166066 A1* | 7/2010 | Perlman | H04N 21/2343 375/240.07 |
| 2014/0094302 A1 | 4/2014 | Wilkiewicz et al. | |
| 2014/0129221 A1 | 5/2014 | Kasai | |
| 2014/0304754 A1 | 10/2014 | Haot et al. | |
| 2017/0304735 A1* | 10/2017 | Shang | H04N 21/4316 |
| 2017/0366591 A1* | 12/2017 | Thomas | H04N 21/8456 |
| 2018/0070057 A1* | 3/2018 | DeAngelis | H04N 5/222 |
| 2019/0208230 A1 | 7/2019 | Fan | |
| 2022/0086508 A1 | 3/2022 | Fan | |

FOREIGN PATENT DOCUMENTS

| | | |
|---|---|---|
| CN | 103823683 A | 5/2014 |
| CN | 104754396 A | 7/2015 |
| CN | 105025314 A | 11/2015 |
| CN | 105407361 A | 3/2016 |
| CN | 105791958 A | 7/2016 |
| CN | 106507161 A | 3/2017 |

OTHER PUBLICATIONS

Tencent Technology, IPRP, PCT/CN2017/111535, Jun. 4, 2019, 6 pgs.

* cited by examiner

LIVE VIDEO BROADCAST METHOD, LIVE BROADCAST DEVICE AND STORAGE MEDIUM

CROSS-REFERENCE TO RELATED APPLICATIONS

This application is a continuation of U.S. application Ser. No. 17/534,255, entitled "LIVE VIDEO BROADCAST METHOD, LIVE BROADCAST DEVICE AND STORAGE MEDIUM" filed Nov. 23, 2021, which is a continuation of U.S. application Ser. No. 16/351,267, entitled "LIVE VIDEO BROADCAST METHOD, LIVE BROADCAST DEVICE AND STORAGE MEDIUM" filed Mar. 12, 2019, which is a continuation of PCT Application PCT/CN2017/111535, entitled "LIVE VIDEO BROADCAST METHOD, LIVE BROADCAST DEVICE AND STORAGE MEDIUM" filed Nov. 17, 2017, which claims priority to Chinese Patent Application No. 201611073970.X, filed with the Chinese Patent Office on Nov. 29, 2016, and entitled "LIVE VIDEO BROADCAST METHOD AND APPARATUS", all of which are incorporated by reference in their entirety.

FIELD OF THE TECHNOLOGY

Embodiments of the present disclosure relate to the Internet field, and in particular, to a live video broadcast method and apparatus, and a storage medium.

BACKGROUND OF THE DISCLOSURE

With the development of science and technology, people have increasing methods to play games, for example, a computer game or a mobile game. Meanwhile, a game user may share a computer game picture or a mobile game picture, that is, performs live broadcasting of and shares the computer game or the mobile game.

SUMMARY

Embodiments of the present disclosure provide a live video broadcast method and apparatus, and a storage medium.

A first aspect of the present disclosure provides a live video broadcast method performed at a first mobile device having one or more processors and memory storing a plurality of programs to be executed by the one or more processors, the method comprising:
  receiving, by the first mobile device, a live broadcast command to live broadcast a video game being played by a user on the first mobile device, wherein the video game generates, in real time, game pictures using a game engine running on the first mobile device;
  creating a video buffer based on the live broadcast command for storing one or more of the game pictures of the video game in real time;
  binding the video buffer with the game engine;
  while the user is playing the video game:
    detecting and extracting a plurality of video picture frames from the video game using the game engine;
    storing the plurality of video picture frames in the video buffer;
  transferring the plurality of video picture frames from the video buffer into a frame buffer;
  displaying the plurality of video picture frames in the frame buffer on the display of the first mobile device;
  collecting voice data using the microphone;
  synchronously synthesizing the voice data and the plurality of video picture frames stored in the video buffer into a video streaming media file corresponding to the video game; and
  uploading the video streaming media file to a live broadcast server, so that the live broadcast server performs live broadcasting of the video streaming media file in response to one or more live streaming requests from other mobile devices.

A second aspect of the present disclosure provides a first mobile device having one or more processors, memory coupled to the one or more processors, and a plurality of computer-readable instructions that, when executed by the one or more processors, cause the first mobile device to perform the aforementioned live video broadcast method.

A third aspect of the present disclosure provides a non-transitory computer readable storage medium storing a plurality of instructions in connection with a server having one or more processors. The plurality of instructions, when executed by the one or more processors, cause the server to perform the aforementioned live video broadcast method.

DESCRIPTION OF EMBODIMENTS

Figure 1:
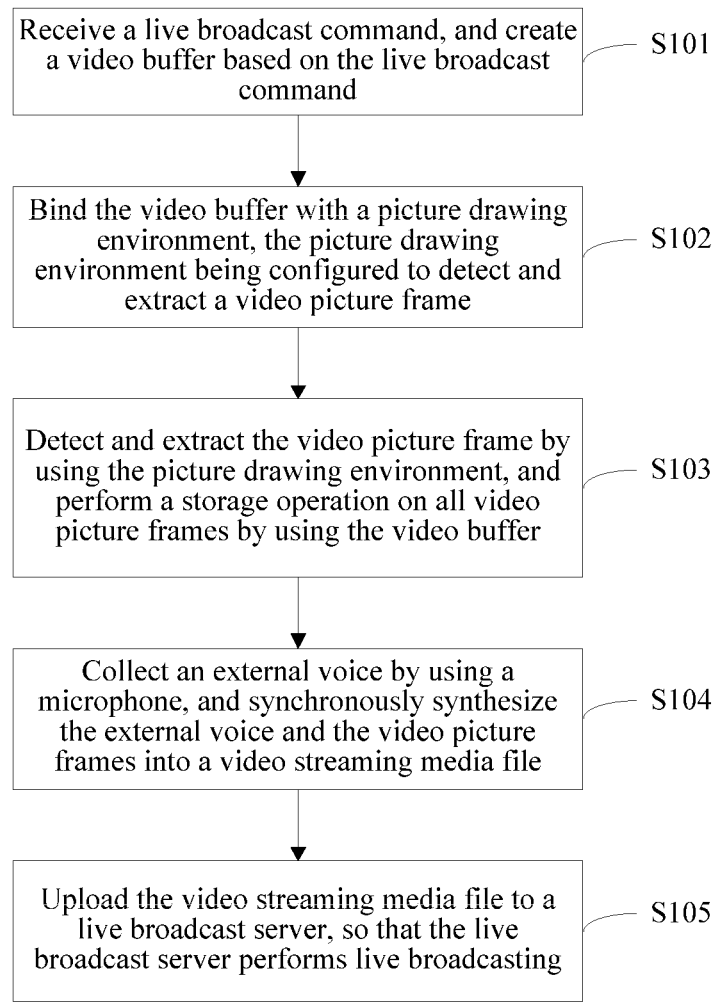
FIG. 1 is a flowchart of a live video broadcast method according to an embodiment of the present disclosure.

Referring to the drawings, same components are represented by same component symbols. The principle of the present disclosure is illustrated by an application in a suitable computing environment. The following description is based on the illustrated specific embodiment of the present disclosure, which should not be construed as limiting other specific embodiments not described in detail herein.

In the description below, the specific embodiments of the present disclosure will be described with reference to steps and signs of operations that are performed by one or more computers, unless indicated otherwise. Therefore, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by a person skilled in the art. The data structures where data is maintained are physical locations of the memory that have particular properties defined by the format of the data. However, while the principle of the present disclosure is being described in the foregoing text, it is not meant to be limiting as a person skilled in the art will appreciate that the various steps and operations described hereinafter may also be implemented in hardware.

The present disclosure provides a live video broadcast method and apparatus. The live video broadcast method and apparatus in the present disclosure may be applied to various mobile terminals, so that the mobile terminal performs live video broadcast on the mobile terminal. The mobile terminal may be a terminal device such as a mobile terminal having an IOS Apple system. A mobile terminal in the present disclosure may perform live video broadcast on the mobile terminal anytime at any place, and present barrage comments (e.g., also referred to as comments) or a comment for a video on another mobile terminal in a timely manner. In some embodiments, barrage comments of a video (e.g., a live video) refer to live comments that are posted by one or more or all viewers of the video in real time as the viewers watch the video on their respective terminal devices. In some embodiments, barrage comments include a plurality of comments from multiple viewers that are displayed in real time while the live video is displayed on a first client device. For example, the plurality of comments are displayed to overlay the video. In some embodiments, the barrage comments are displayed with any type of suitable animation, such as scrolling left or right, sliding up and down, flying up and down, etc. In some embodiments, the barrage comments are displayed simultaneously as the corresponding video content are being displayed on the first client device. For example, comments about a certain scene of a live video posted by multiple viewers from their respective terminal devices are displayed on the first client device while image frames associated with the certain scene are being broadcasted on the first client device. The terminal device includes a memory and a processor. The memory stores an instruction that can be executed by the processor. The processor implements the live video broadcast method in the following embodiments by executing the instruction.

Referring to FIG. 1, FIG. 1 is a flowchart of an embodiment of a live video broadcast method according to the present disclosure. The live video broadcast method in this embodiment may be implemented by using the foregoing mobile terminal. The live video broadcast method in this embodiment includes:

Step S101. Receive a live broadcast command, and create a video buffer based on the live broadcast command.

Step S102. Bind the video buffer with a picture drawing environment, the picture drawing environment being configured to detect and extract a video picture frame.

Step S103. Detect and extract the video picture frame by using the picture drawing environment (that is, detect and extract a video picture by using a picture drawing module), and perform a storage operation on all video picture frames by using the video buffer.

Step S104. Collect an external voice by using a microphone, and synchronously synthesize the external voice and the video picture frames into a video streaming media file.

Step S105. Upload the video streaming media file to a live broadcast server, so that the live broadcast server performs live broadcasting.

A specific procedure of each step of the live video broadcast method in this embodiment is described in detail below.

In step S101, a live video broadcast apparatus (a mobile terminal) receives a live broadcast command of a user. The live broadcast command is a command that the user requests to upload a current video picture of the live video broadcast apparatus, for example, a game picture of a currently running game, to the live broadcast server, to perform live broadcasting of the video picture.

Subsequently, the live video broadcast apparatus creates a video buffer based on the live broadcast command. The video buffer is used to perform a storage operation on a video picture frame of a current video. Subsequently, step S102 is performed.

In step S102, the live video broadcast apparatus binds the video buffer created in step S101 and the picture drawing environment. The picture drawing environment is configured to detect and extract the video picture frame of the current video. The picture drawing environment may be a game drawing environment such as an OpenGL (Open Graphics Library) context. After binding the video buffer with the picture drawing environment, the live video broadcast apparatus may extract the video picture frame detected by the picture drawing environment into the video buffer. Subsequently, step S103 is performed.

It may be understood that the picture drawing environment a software system having a picture drawing function, an applet, or the like. Therefore, the picture drawing environment may alternatively be referred to as "the picture drawing module". Therefore, step S102 may alternatively be described as "Bind the video buffer with the picture drawing module".

In step S103, the live video broadcast apparatus detects and extracts the video picture frame by using the picture drawing environment, and subsequently, the live video broadcast apparatus performs the storage operation on all the video picture frames by using the video buffer created in step S101. Subsequently, step S104 is performed.

It may be understood that, that the video buffer is used to perform the storage operation on all the video picture frames is actually that all the video picture frames extracted by the picture drawing environment are stored in the video buffer.

In step S104, the live video broadcast apparatus collects an external voice of the live video broadcast apparatus by using a microphone of the live video broadcast apparatus. The external voice may include a sound given by a horn of the live video broadcast apparatus, a voice of a video user, and the like. Such external voice may both include a video sound, and may also include an explanation of a video by a video user, or even surrounding environment music of the video user. Certainly, the video user herein may alternatively disable the video sound as required, and only reserve the voice of the video user and the like.

Subsequently, the live video broadcast apparatus synchronously synthesizes the collected external voice and the video picture frame collected in step S103, to generate the video streaming media file, such as an FLV (Flash Video) streaming media file. The video user may control the size of the video streaming media file by controlling a frame rate of the generated video streaming media file. In this way, video picture live broadcast content including both video information and audio information is obtained. Subsequently, step S105 is performed.

In step S105, the live video broadcast apparatus uploads the video streaming media file synthesized in step S104 to the live broadcast server, so that the live broadcast server may use the video streaming media file to perform live broadcasting of the video.

In this way, a live video broadcast process of the live video broadcast method in this embodiment is completed.

According to the live video broadcast method in this embodiment, the video picture frame and the external voice are synthesized by configuring an additional video buffer, so that the live broadcast server processed a synthesized video streaming media file. The video user may perform live broadcasting of a mobile video anytime.

Figure 2:
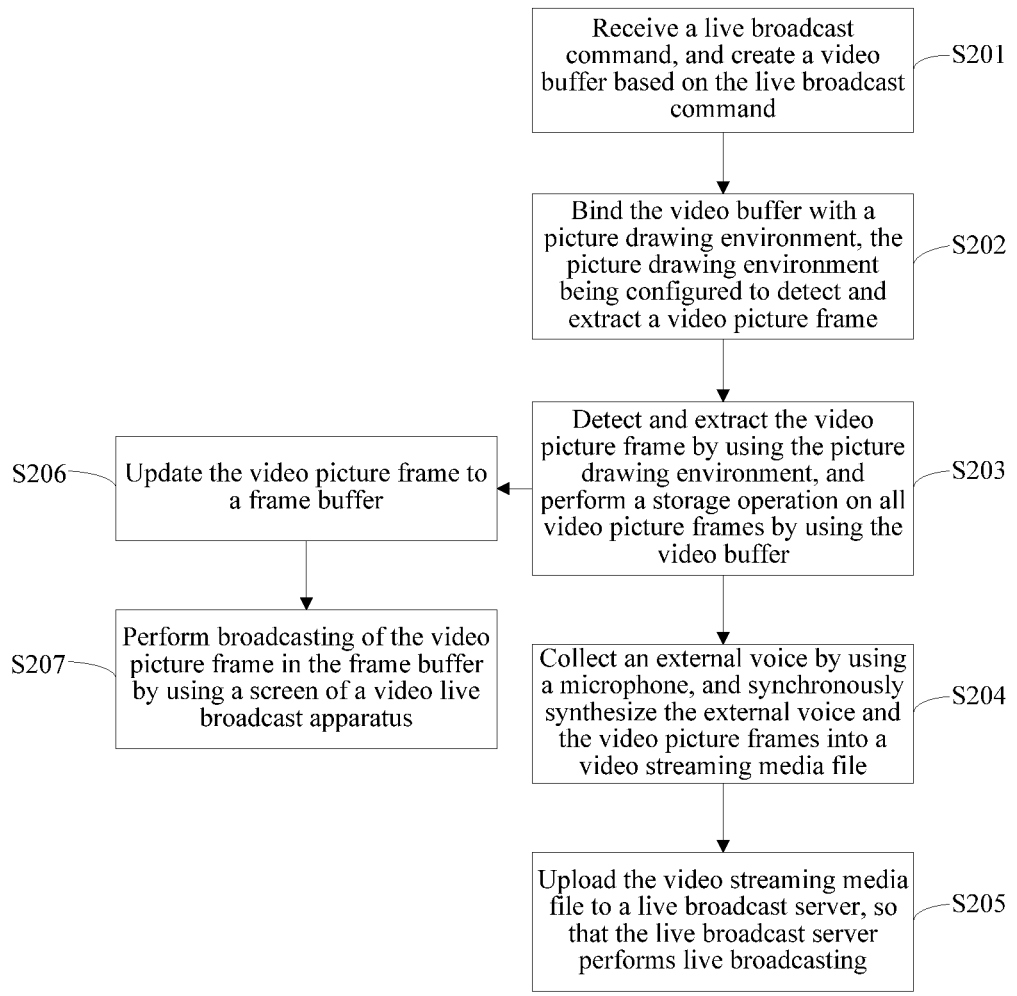
FIG. 2 is a flowchart of a live video broadcast method according to an embodiment of the present disclosure.

Referring to FIG. 2, FIG. 2 is a flowchart of an embodiment of a live video broadcast method according to the present disclosure. The live video broadcast method in this embodiment may be implemented by using the foregoing mobile terminal. The live video broadcast method in this embodiment includes:

Step S201. Receive a live broadcast command, and create a video buffer based on the live broadcast command.

Step S202. Bind the video buffer with a picture drawing environment, the picture drawing environment being configured to detect and extract a video picture frame.

Step S203. Detect and extract the video picture frame by using the picture drawing environment, and perform a storage operation on all video picture frames by using the video buffer.

Step S204. Collect an external voice by using a microphone, and synchronously synthesize the external voice and the video picture frames into a video streaming media file.

Step S205. Upload the video streaming media file to a live broadcast server, so that the live broadcast server performs live broadcasting.

Step S206. Update the video picture frame to a frame buffer.

Step S207. Perform broadcasting of the video picture frame in the frame buffer by using a screen of the live video broadcast apparatus.

A specific procedure of each step of the live video broadcast method in this embodiment is described in detail below.

Figure 3:
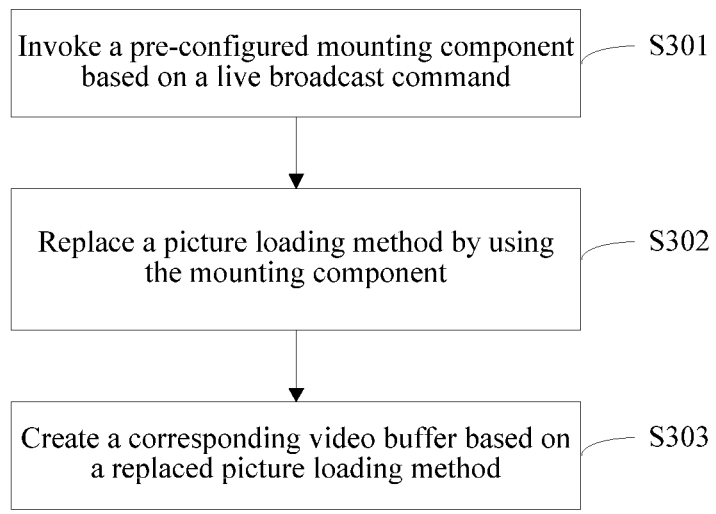
FIG. 3 is a flowchart of step S201 of a live video broadcast method according to an embodiment of the present disclosure.

In step S201, the live video broadcast apparatus receives the live broadcast command, and creates the video buffer based on the live broadcast command. Specifically, referring to FIG. 3, FIG. 3 is a flowchart of step S201 in this embodiment of the live video broadcast method according to the present disclosure. Step S201 may include the following steps.

Step S301: The live video broadcast apparatus invokes a pre-configured mounting component based on the live broadcast command. On existing live video broadcast apparatuses, especially on a live video broadcast apparatus of an IOS Apple system, a bottom layer of a game engine uses both OpenGL and Metal. Therefore, the preconfigured mounting component may be used to detect game picture loading of the game engine. Subsequently, step S302 is performed.

Step S302. When the live video broadcast apparatus detects game picture loading of a game engine, replace a picture loading method by using the mounting component invoked in step S301.

Specifically, the live video broadcast apparatus detects whether the picture loading method is invoked, and if the picture loading method is invoked, replaces a picture drawing method in the picture loading method. For example, an occasion of invoking a static method may be triggered by loading Class of a game to a memory, to replace a picture drawing method, for example, presentRenderbuffer, in the picture loading method, so that an OpenGL (Open Graphics Library) context of a game drawing environment may detect updating of a video picture frame. In this way, the live video broadcast apparatus may detect each video picture frame of a current video by using a replaced picture loading method. Subsequently, step S303 is performed.

Step S303. The live video broadcast apparatus creates a corresponding video buffer based on the picture loading method replaced in step S302, to perform a storage operation on a video picture frame extracted by a picture drawing environment. Subsequently, step S202 is performed.

In step S202, the live video broadcast apparatus binds the video buffer created in step S201 with the picture drawing environment. After binding the video buffer with the picture drawing environment, the live video broadcast apparatus can extract the video picture frame detected by the picture drawing environment into the video buffer. Subsequently, step S203 is performed.

In step S203, the live video broadcast apparatus detects and extracts the video picture frame by using the picture drawing environment, and subsequently, the live video broadcast apparatus performs the storage operation on all the video picture frames by using the video buffer created in step S201. Subsequently, step S204 and step S206 are performed.

In step S204, the live video broadcast apparatus collects the external voice of the live video broadcast apparatus by using the microphone of the live video broadcast apparatus. Subsequently, the live video broadcast apparatus synchronously synthesizes the collected external voice and the video picture frame collected in step S203, to generate the video streaming media file, such as an FLV (Flash Video) streaming media file. A user may control the size of the video streaming media file by controlling a frame rate of the generated video streaming media file. In this way, video picture live broadcast content including both video information and audio information is obtained. Subsequently, step S202 is performed.

In step S205, the live video broadcast apparatus uploads the video streaming media file synthesized in step S204 to the live broadcast server, so that the live broadcast server may use the video streaming media file to perform live broadcasting of the video.

Specifically, when performing live broadcasting of the video streaming media file, the live broadcast server may receive comment information of another terminal; and subsequently synthesize the comment information with the video streaming media file, to obtain a live streaming media file, and finally the live broadcast server performs a playback operation on the live streaming media file. In this way, comments of others users may be presented in a timely manner during live broadcasting of the mobile video.

In addition, the live broadcast server may further receive barrage comments information from another terminal. Subsequently, when performing the playback operation on the video streaming media file, the live broadcast server synchronously superimpose the comments information on a playback screen. In this way, barrage comments information of others users may be presented in a timely manner during live broadcasting of the mobile video.

In step S206, in addition to uploading the video picture to the live broadcast server, presentation of the video picture on the live video broadcast apparatus also needs to be ensured continuously. Therefore, the live video broadcast apparatus further needs to update the video picture frame extracted in step S203 from the video buffer to the frame buffer. The frame buffer is configured to perform the storage operation on the video picture frame presented on the screen of the live video broadcast apparatus. Subsequently, step S207 is performed.

It may be understood that, in fact, S206 is that the video picture frame in the video buffer is extracted and stored in the frame buffer, so that the video picture frame in the frame buffer may be drawn onto a display interface. That is, the video picture frame in the frame buffer is displayed on a terminal screen, to implement playback of the video picture.

In step S207, the live video broadcast apparatus performs playback of the video picture frame in the frame buffer by using the screen. In this way, normal display of the video picture on the live video broadcast apparatus is also ensured.

In this way, a live video broadcast process of the live video broadcast method in this embodiment is completed.

Based on the previous embodiment, in the live video broadcast method in this embodiment, the mounting component is disposed, to further improve stability of obtaining the video picture frame; setting of the video buffer and the frame buffer ensures normal display of a live broadcast picture and the video picture; and the live broadcast server may further present barrage comments and a comment of another user in a timely manner.

Figure 4:
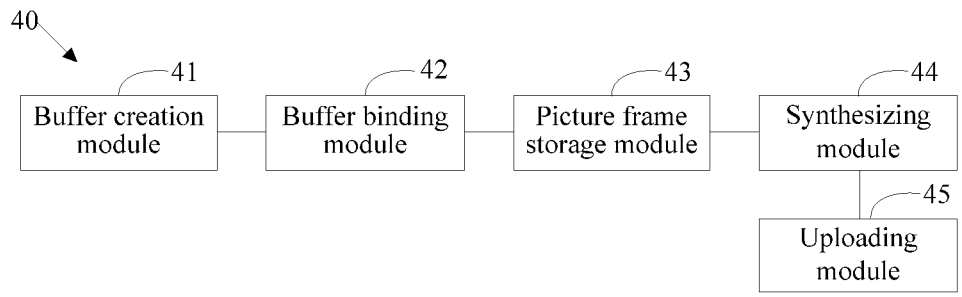
FIG. 4 is a schematic structural diagram of a live video broadcast apparatus according to an embodiment of the present disclosure.

The present disclosure further provides a live video broadcast apparatus. Referring to FIG. 4, FIG. 4 is a schematic structural diagram of a live video broadcast apparatus according to an embodiment of the present disclosure. The live video broadcast apparatus in this embodiment may use the live video broadcast method in the foregoing first embodiment. The live video broadcast apparatus 40 in this embodiment includes: one or more memories; and one or more processors, the one or more memories storing one or more command modules, configured to be executed by the one or more processors, the one or more command modules including a buffer creation module 41, a buffer binding module 42, a picture frame storage module 43, a synthesizing module 44, and an uploading module 45.

The buffer creation module 41 is configured to: receive a live broadcast command, and create a video buffer based on the live broadcast command. The buffer binding module 42 is configured to bind the video buffer with a picture drawing environment, where the picture drawing environment is configured to detect and extract a video picture frame. The picture frame storage module 43 is configured to: detect and extract the video picture frame by using the picture drawing environment, and perform a storage operation on all video picture frames by using the video buffer. The synthesizing module 44 is configured to: collect an external voice by using a microphone, and synchronously synthesize the external voice and the video picture frames into a video streaming media file. The uploading module 45 is configured to upload the video streaming media file to a live broadcast server, so that the live broadcast server performs live broadcasting.

When the live video broadcast apparatus 40 is used, the buffer creation module 41 receives a live broadcast command of a user. The live broadcast command is a command that the user requests to upload a current video picture of the live video broadcast apparatus, for example, a game picture of a currently running game, to the live broadcast server, to perform live broadcasting of the video picture.

Subsequently, the buffer creation module 41 creates a video buffer based on the live broadcast command. The video buffer is used to perform a storage operation on a video picture frame of a current video.

Subsequently, the buffer binding module 42 binds the video buffer created by the buffer creation module 41 with a picture drawing environment. The picture drawing environment is configured to detect and extract the video picture frame of the current video. The picture drawing environment may be a game drawing environment such as an OpenGL (Open Graphics Library) context. After binding the video buffer with the picture drawing environment, the live video broadcast apparatus may extract the video picture frame detected by the picture drawing environment into the video buffer.

Subsequently, the picture frame storage module 43 detects and extracts the video picture frame by using the picture drawing environment. Subsequently, the picture frame storage module 43 performs a storage operation on all video picture frames by using the video buffer created by the buffer creation module.

Subsequently, the synthesizing module 44 collects an external voice of the live video broadcast apparatus by using the microphone of the live video broadcast apparatus 40. The external voice may include a sound given by a horn of the live video broadcast apparatus, a voice of a video user, and the like. Such external voice may both include a video sound, and may also include an explanation of a video by a video user, or even surrounding environment music of the video user. Certainly, the video user herein may alternatively disable the video sound as required, and only reserve the voice of the video user and the like.

Subsequently, the synthesizing module 44 synchronously synthesizes the collected external voice and the video picture frame collected by the picture frame storage module, to generate the video streaming media file, such as an FLV (Flash Video) streaming media file. The video user may control the size of the video streaming media file by controlling a frame rate of the generated video streaming media file. In this way, video picture live broadcast content including both video information and audio information is obtained.

Finally, the uploading module 45 uploads the video streaming media file synthesized by the synthesizing module 44 to the live broadcast server, so that the live broadcast server may perform live broadcasting of the video by using the video streaming media file.

In this way, a live video broadcast process of the live video broadcast apparatus 40 in this embodiment is completed.

According to the live video broadcast apparatus in this embodiment, the video picture frame and the external voice are synthesized by configuring an additional video buffer, so that the live broadcast server processed a synthesized video streaming media file. The video user may perform live broadcasting of a mobile video anytime.

Figure 5:
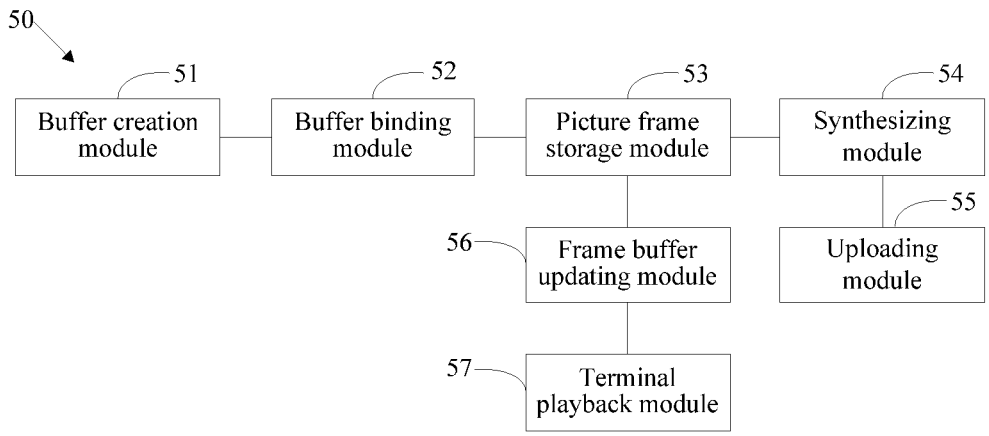
FIG. 5 is a schematic structural diagram of a live video broadcast apparatus according to an embodiment of the present disclosure.

Referring to FIG. 5, FIG. 5 is a schematic structural diagram of a live video broadcast apparatus according to an embodiment of the present disclosure. The live video broadcast apparatus in this embodiment may use the live video broadcast method in the foregoing second embodiment. The live video broadcast apparatus 50 in this embodiment includes:

one or more memories; and one or more processors, the one or more memories storing one or more command modules, configured to be executed by the one or more processors, the one or more command modules including a buffer creation module 51, a buffer binding module 52, a picture frame storage module 53, a synthesizing module 54, an uploading module 55, a frame buffer updating module 56, and a terminal playback module 57.

The buffer creation module 51 is configured to: receive a live broadcast command, and create a video buffer based on the live broadcast command. The buffer binding module 52 is configured to bind the video buffer with a picture drawing environment, where the picture drawing environment is configured to detect and extract a video picture frame. The picture frame storage module 53 is configured to: detect and extract the video picture frame by using the picture drawing environment, and perform a storage operation on all video picture frames by using the video buffer. The synthesizing module 54 is configured to: collect an external voice by using a microphone, and synchronously synthesize the external voice and the video picture frames into a video streaming media file. The uploading module 55 is configured to upload the video streaming media file to a live broadcast server, so that the live broadcast server performs live broadcasting. The frame buffer updating module 56 is configured to update the video picture frame to a frame buffer. The terminal playback module 57 is configured to perform playback of the video picture frame in the frame buffer by using a screen of a mobile terminal.

Figure 6:
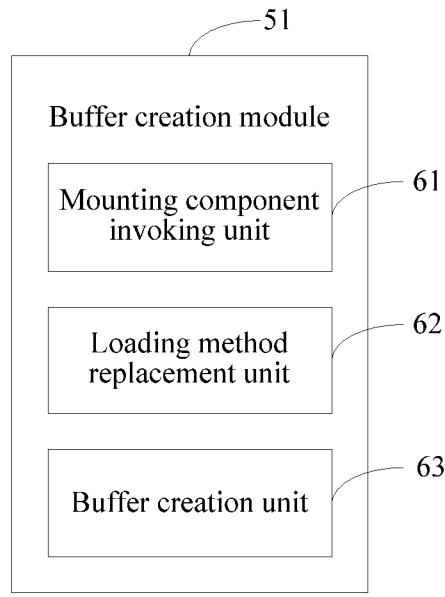
FIG. 6 is a schematic structural diagram of a buffer creation module of a live video broadcast apparatus according to an embodiment of the present disclosure.

Referring to FIG. 6, FIG. 6 is a schematic structural diagram of a buffer creation module of a live video broadcast apparatus according to an embodiment of the present disclosure. The buffer creation module 51 includes a mounting component invoking unit 61, a loading method replacement unit 62, and a buffer creation unit 63.

The mounting component invoking unit 61 is configured to invoke a pre-configured mounting component based on a live broadcast command. The loading method replacement unit 62 is configured to replace a picture loading method by using the mounting component. The buffer creation unit 63 creates a corresponding video buffer based on a replaced picture loading method.

Figure 7:
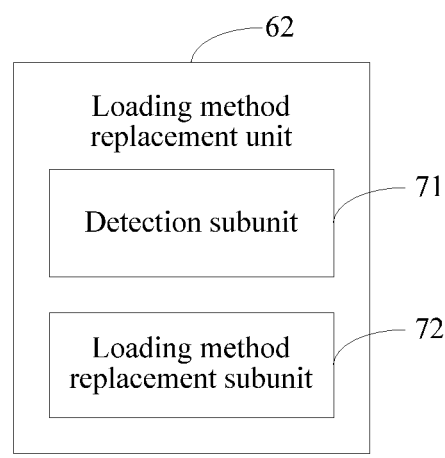
FIG. 7 is a schematic structural diagram of a loading method replacement unit of a buffer creation module of a live video broadcast apparatus according to an embodiment of the present disclosure.

Referring to FIG. 7, FIG. 7 is a schematic structural diagram of a loading method replacement unit of a buffer creation module of a live video broadcast apparatus according to an embodiment of the present disclosure. The loading method replacement unit 62 includes a detection subunit 71 and a loading method replacement subunit 72.

The detection subunit 71 is configured to detect whether a picture loading method is invoked. The loading method replacement subunit 72 is configured to: if the picture loading method is invoked, replace a picture drawing method in the picture loading method, so that updating of a video picture frame is detected by using a picture drawing environment.

When the live video broadcast apparatus 50 in this embodiment is used, the buffer creation module 51 first receives the live broadcast command, and creates the video buffer based on the live broadcast command.

Specifically, the mounting component invoking unit 61 of the buffer creation module 51 invokes the mounting component based on the live broadcast command. On existing live video broadcast apparatuses, especially on a live video broadcast apparatus of an IOS Apple system, a bottom layer of a game engine uses both OpenGL and Metal. Therefore, the pre-configured mounting component may be used to detect game picture loading of the game engine.

When the live video broadcast apparatus 50 detects game picture loading of the game engine, the loading method replacement unit 62 of the buffer creation module 51 immediately uses the mounting component invoked by the mounting component invoking unit to replace the picture loading method.

Specifically, the detection subunit 71 of the loading method replacement unit 62 detects whether the picture loading method is invoked. If the picture loading method is invoked, the loading method replacement subunit 72 of the loading method replacement unit 62 replaces the picture drawing method in the picture loading method. For example, an occasion of invoking a static method may be triggered by loading Class of a game to a memory, to replace the picture drawing method, for example, presentRenderbuffer, in the picture loading method, so that an OpenGL (Open Graphics Library) context of a game drawing environment may detect updating of a video picture frame. In this way, the live video broadcast apparatus 50 may detect each video picture frame of a current video by using the replaced picture loading method.

The buffer creation unit 63 of the buffer creation module 51 creates the corresponding video buffer based on the picture loading method replaced by the loading method replacement unit 62, so as to perform the storage operation on the video picture frame extracted by the picture drawing environment.

Subsequently, the buffer binding module 52 binds the video buffer created by the buffer creation module 51 with the picture drawing environment. After binding the video buffer with the picture drawing environment, the live video broadcast apparatus 50 may extract the video picture frame detected by the picture drawing environment into the video buffer.

Subsequently, the picture frame storage module 53 detects and extracts the video picture frame by using the picture drawing environment. Subsequently, the picture frame storage module 53 performs the storage operation on all video picture frames by using the video buffer created by the buffer creation module.

Subsequently, the synthesizing module 54 collects the external voice of the live video broadcast apparatus by using the microphone of the live video broadcast apparatus 50. Subsequently, the synthesizing module 54 synchronously synthesizes the collected external voice and the video picture frame collected by the picture frame storage module, to generate the video streaming media file, such as an FLV (Flash Video) streaming media file. A user may control the size of the video streaming media file by controlling a frame rate of the generated video streaming media file. In this way, video picture live broadcast content including both video information and audio information is obtained.

Finally, the uploading module 55 uploads the video streaming media file synthesized by the synthesizing module 54 to the live broadcast server, so that the live broadcast server may perform live broadcasting of the video by using the video streaming media file.

Figure 8:
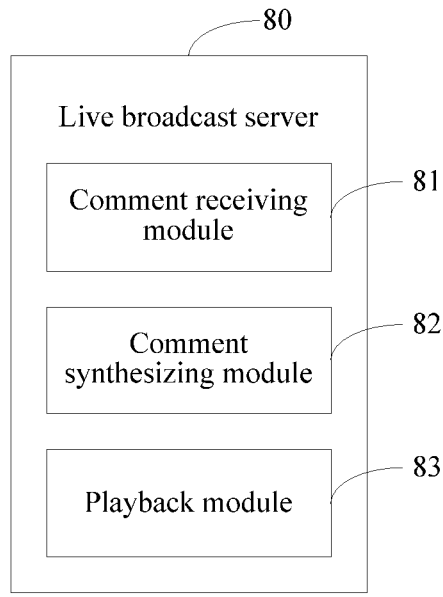
FIG. 8 is a schematic structural diagram of a live broadcast server corresponding to a live video broadcast apparatus according to an embodiment of the present disclosure.

Specifically, referring to FIG. 8, FIG. 8 is a schematic structural diagram 1 of a live broadcast server corresponding to a live video broadcast apparatus according to an embodiment of the present disclosure. The live broadcast server 80 includes a comment receiving module 81, a comment synthesizing module 82, and a playback module 83.

The comment receiving module 81 is configured to receive comment information of another terminal. The comment synthesizing module 82 is configured to synthesize the comment information and the video streaming media file, to obtain a live streaming media file. The playback module 83 is configured to perform a playback operation on the live streaming media file.

When the live broadcast server 80 performs live broadcasting of the video streaming media file, the comment receiving module 81 may receive the comment information of the another terminal. Subsequently, the comment synthesizing module 82 synthesizes the comment information with the video streaming media file, to obtain the live streaming media file. Finally, the playback module 83 performs the playback operation on the live streaming media file. In this way, comments of others users may be presented in a timely manner during live broadcasting of the mobile video.

Figure 9:
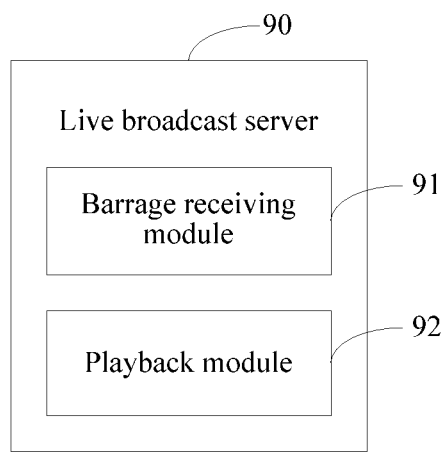
FIG. 9 is a schematic structural diagram of a live broadcast server corresponding to a live video broadcast apparatus according to an embodiment of the present disclosure.

In addition, further referring to FIG. 9, FIG. 9 is a schematic structural diagram 2 of a live broadcast server corresponding to a live video broadcast apparatus according to an embodiment of the present disclosure. The live broadcast server 90 includes a barrage comments receiving module 91 and a playback module 92. The barrage comments receiving module 91 is configured to receive barrage comments information of another terminal. The playback module 92 is configured to perform a playback operation on the video streaming media file, and synchronously superimpose the barrage comments information on a playback screen.

The barrage comments receiving module 91 receives the barrage comments information of the another terminal. Subsequently, the playback module 92 performs the playback operation on the video streaming media file, and synchronously superimposes the barrage comments information on the playback screen. In this way, barrage comments information of others users may be presented in a timely manner during live broadcasting of the mobile video.

Meanwhile, in addition to uploading the video picture to the live broadcast server, presentation of the video picture on the live video broadcast apparatus also needs to be ensured continuously. Therefore, the frame buffer updating module 56 of the live video broadcast apparatus 50 further needs to update the video picture frame extracted by the picture frame storage module from the video buffer to the frame buffer. The frame buffer is configured to perform a storage operation on the video picture frame presented on the screen of the live video broadcast apparatus.

Finally, the terminal playback module 57 performs playback of the video picture frame in the frame buffer by using the screen. In this way, normal display of the video picture on the live video broadcast apparatus is also ensured.

In this way, a live video broadcast process of the live video broadcast apparatus 50 in this embodiment is completed.

Based on the foregoing first embodiment, in the live video broadcast apparatus in this embodiment, the mounting component is disposed, to further improve stability of obtaining the video picture frame; setting of the video buffer and the frame buffer ensures normal display of a live broadcast picture and the video picture; and the live broadcast server may further present barrage comments and a comment of another user in a timely manner.

Figure 10:
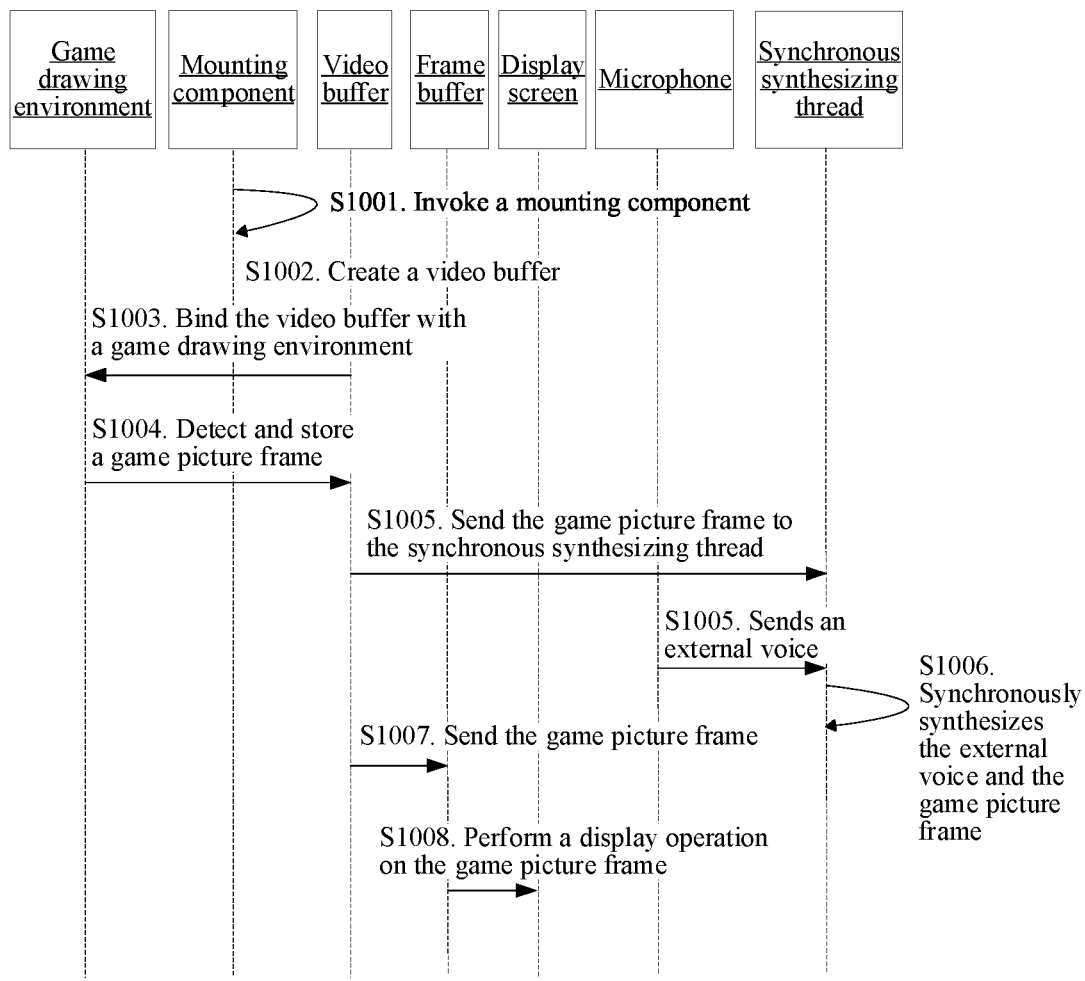
FIG. 10 is a sequence diagram of a working process of a specific embodiment of a live video broadcast method and apparatus according to an embodiment of the present disclosure.

A specific working principle of a live video broadcast method and apparatus of the present disclosure is described below by using a specific embodiment. Referring to FIG. 10, FIG. 10 is a sequence diagram of a working process of the specific embodiment of the live video broadcast method and apparatus according to the present disclosure. The live video broadcast apparatus may be disposed in a corresponding mobile terminal having an IOS Apple system. The mobile terminal includes: a game drawing environment configured to detect and extract a game picture frame, a mounting component invoking the game drawing environment, a video buffer storing a game picture frame for live broadcasting, a frame buffer storing a game picture frame displayed on the mobile terminal, a display screen that is on the mobile terminal and on which the game picture frame is displayed, a microphone collecting an external voice, and a synchronous synthesizing thread synthesizing the external voice and the game picture frame in the video buffer.

A live video broadcast process of this specific embodiment includes:

Step S1001. After receiving a game live broadcast command of a user, the mobile terminal invokes the corresponding mounting component.

Step S1002. The mounting component creates the video buffer by replacing a game picture loading method.

Step S1003. Bind the video buffer with the game drawing environment.

Step S1004. The game drawing environment detects the game picture frame, and stores the game picture frame in the video buffer.

Step S1005. The video buffer sends the game picture frame to the synchronous synthesizing thread, and the microphone also sends the collected external voice to the synchronous synthesizing thread at the same time.

Step S1006. The synchronous synthesizing thread synchronously synthesizes the external voice and the game picture frame, to form an FLV streaming media file; and sends the FLV streaming media file to the live broadcast server to perform live broadcasting of a game video.

Step S1007. The video buffer sends the game picture frame to the frame buffer.

Step S1008. The display screen displays the game picture frame in the frame buffer, thereby ensuring normal display of a game picture on the mobile terminal.

In this way, according to the live video broadcast method and apparatus in this specific embodiment, live broadcast display of the game picture on the live broadcast server and local display of the game picture on the mobile terminal are completed.

According to the live video broadcast method and apparatus of the present disclosure, the video picture frame and the external voice are synthesized by configuring an additional video buffer, so that the live broadcast server processes a synthesized video streaming media file. A video user may perform live broadcasting of a mobile terminal any time, and the live broadcast server may present barrage comments and a comment of another user in a timely manner, to resolve technical problems that live broadcasting of the mobile video cannot be performed any time according to an existing live video broadcast method and apparatus, and the barrage comments and the comments of other users cannot be presented in a timely manner during live broadcasting of the mobile video.

The terms, such as "component", "module", "system", "interface", and "process", used in the present disclosure generally indicate a computer-related entity: hardware, a combination of hardware and software, software, or software in execution. For example, a component may be, but is not limited to, a process running on a processor, a processor, an object, an executable application, an executed thread, a program, and/or a computer. With reference to the drawings, an application running on a controller and the controller may both be components. One or more components may be in an executed process and/or thread and the components may be located on one computer and/or distributed between or among two or more computers.

Figure 11:
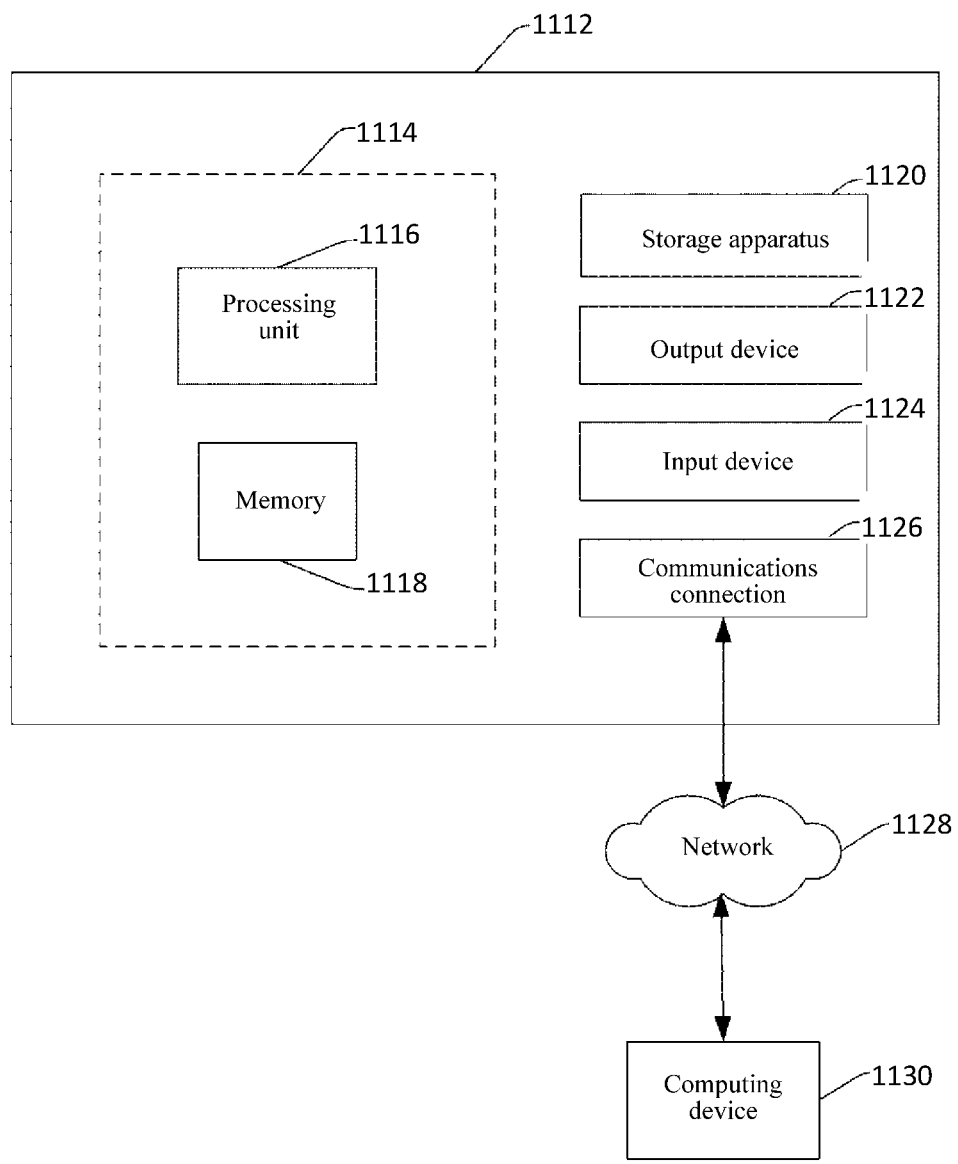
FIG. 11 is a schematic structural diagram of an operating environment of an electronic device in which a live video broadcast apparatus is located according to an embodiment of the present disclosure.

FIG. 11 and the following discussions provide short and summary descriptions of a working environment of an electronic device in which the live video broadcast apparatus of the present disclosure is located. The working environment in FIG. 11 is only an instance of a suitable working environment, and is not intended to suggest any limitation to a scope of a purpose or a function of the working environment. The instance of an electronic device 1112 includes, but is not limited to, a wearable device, a head mounted device, a medical health platform, a personal computer, a server computer, a handheld or laptop device, a mobile device (for example, a mobile phone, a personal digital assistant (PDA), and a media player), a multiprocessor system, a consumption-based electronic device, a minicomputer, a mainframe computer, a distributed computing environment including the foregoing any system or device, and the like.

Although not required, this embodiment is described under a general background that "a computer-readable instruction" is executed by one or more electronic devices. The computer-readable instruction may be distributed by a computer-readable medium (discussed below). The computer readable instruction may be implemented as a program module, for example, a function, an object, an application programming interface (API), or a data structure for performing a specific task or implementing a specific abstract data type. Typically, functions of the computer readable instruction may be randomly combined or distributed in various environments.

FIG. 11 shows the instance of the electronic device 1112 including one or more embodiments of the live video broadcast apparatus of the present disclosure. In a configuration, the electronic device 1112 includes at least one processing unit 1116 and a memory 1118. Based on an exact configuration and type of the electronic device, the memory 1118 may be a volatile memory (for example, a RAM), a non-volatile memory (for example, a ROM or a flash memory), or a combination thereof. The configuration is represented by using a dashed line 1114 in FIG. 11.

In another embodiment, the electronic device 1112 may include an additional feature and/or function. For example, the device 1112 may further include an additional storage apparatus (for example, a removable/or non-removable storage apparatus), and includes, but is not limited to, a magnetic storage apparatus, an optical storage apparatus, and the like. The additional storage apparatus is represented by using a storage apparatus 1120 in FIG. 11. In an embodiment, a computer-readable instruction used to implement one or more embodiments provided in the present disclosure may be stored in the storage apparatus 1120. The storage apparatus 1120 may further be configured to store other computer-readable instructions for implementing an operating system, an application program, and the like. For example, the computer-readable instruction may be loaded to the memory 1118, and executed by the processing unit 1116.

The term "computer-readable media" used in the present disclosure includes a computer storage medium. The computer storage media includes volatile and non-volatile media, and removable and non-removable media implemented by using any method or technology used for storing information such as a computer-readable instruction or other data. The memory 1118 and the storage apparatus 1120 are instances of the computer storage media. The computer storage media includes, but is not limited to a RAM, a ROM, an EEPROM, a flash memory or another storage technology, a CD-ROM, a digital versatile disc (DVD) or another optical storage apparatus, a cassette, a magnetic tape, a magnetic disk storage device, or any other media configured to store desired information and accessed by the electronic device 1112. Such a computer storage medium may be a part of the electronic device 1112.

The electronic device 1112 may further include a communications connection 1126 allowing communication between the electronic device 1112 and another device. The communications connection 1126 may include, but is not limited to, a modem, a network interface card (NIC), an integrated network interface, RF transmitter/receiver, infrared port, a USB connection, or another interface configured to connect the electronic device 1112 to another electronic device. The communications connection 1126 may include a wired connection or a wireless connection. The communications connection 1126 may transmit and/or receive a communications medium.

The term "computer-readable media" may include the communications medium. Typically, the communications medium includes a computer-readable instruction or other data in a "modulated data signal", for example, a carrier or another transmission mechanism, and includes any information transmission medium. The term "modulated data signal" may include such a signal: One or more features of the signal are set or changed by encoding information into the signal.

The electronic device 1112 may include an input device 1124, for example, a keyboard, a mouse, a stylus, a voice input device, a touch input device, an infrared camera, a video input device, and/or any other input device. The device 1112 may further include an output device 1122, for example, one or more displays, a speaker, a printer, and/or any other output device. The input device 1124 and the output device 1122 may be connected to the electronic device 1112 through a wired connection, a wireless connection, or any combination thereof. In an embodiment, an input device or an output device of another electronic device may be used as the input device 1124 or the output device 1122 of the electronic device 1112.

The components of the electronic device 1112 may be connected by using various interconnects (for example, a bus). Such interconnect may include a peripheral component interconnect (PCI) (for example, a PCI express), a universal serial bus (USB), a live line (IEEE 1394), an optical bus structure, and the like. In another embodiment, the components of the electronic device 1112 may be interconnected by using a network. For example, the memory 1118 may include a plurality of physical memory units located at different physical positions and interconnected by using the network.

A person skilled in the art may be aware that a storage device configured to store the computer-readable instruction may be distributed across the network. For example, the electronic device 1130 that may be accessed by using a network 1128 may store a computer-readable instruction used to implement one or more embodiments of the present disclosure. The electronic device 1112 may access the electronic device 1130 and download a part or all of the computer-readable instruction for execution. Alternatively, the electronic device 1112 may download a plurality of computer-readable instructions as required, or some instructions may be executed by the electronic device 1112 and some instructions may be executed by the electronic device 1130.

The present disclosure provides various operations of embodiments. In an embodiment, the one or more operations may constitute one or more computer-readable instructions stored on a computer-readable medium, and the computer-readable instructions enable a computing device to perform the operations when the computer-readable instructions are executed by an electronic device. Describing a sequence of some or all operations shall not be interpreted as implying that the operations must be sequentially related. A person skilled in the art will understand an alternative sequence having the benefits of the present specification. Moreover, it should be understood that not all operations necessarily exist in each embodiment provided in the present disclosure.

Furthermore, although the present disclosure is shown and described by using one or more implementation manners, a person skilled in the art may conceive of equivalent variations and modifications based on reading and understanding on the specification and the accompany drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the exemplary implementation manners in the present disclosure shown in the specification. In addition, although specific features of the specification are disclosed with respect to only one of several implementation manners, the features may be combined with one or more other features of other implementation manners that are desirable for and advantageous to a given or specific application. Moreover, when the terms "include", "include", "contain" and any variants thereof are used in a specific implementation or the claims, the terms are intended to cover in a manner similar to "include".

Functional units according to the embodiments of the present disclosure may be integrated in one processing module or exist as separate physical units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium. The aforementioned storage medium may be a read-only memory, a magnetic disk or an optical disc. The foregoing apparatuses or systems can execute methods in corresponding process embodiments.

An embodiment of the present disclosure further provides a non-volatile computer-readable storage medium, storing a computer program, and when the program is executed by the processor, steps of the foregoing method being implemented.

In conclusion, although the present disclosure is disclosed above by using the embodiments, the sequence numbers such as "first" and "second" in the embodiments are used merely for ease of description, but do not limit a sequence of the embodiments of the present disclosure. Moreover, the foregoing embodiments are not used to limit the present disclosure. A person of ordinary skill in the art may make various modifications and refinements without departing from the spirit of the present disclosure. Therefore, the protection scope of the present disclosure shall be subject to scope defined by the claims.

What is claimed is:

1. A live video broadcast method performed at a terminal device, the method comprising:
    receiving a live broadcast command to live broadcast a video game in real time;
    creating a video buffer based on the live broadcast command for storing one or more game pictures of the video game in real time;
    while playing the video game in real time:
        extracting a plurality of video picture frames from the video game;
            storing the plurality of video picture frames in the video buffer;
    displaying the plurality of video picture frames on a display of the terminal device;
        collecting voice data using a microphone of the terminal device in real time;
        synchronously synthesizing the voice data and the plurality of video picture frames stored in the video buffer into a video streaming media file corresponding to the video game; and
        uploading the video streaming media file to a live broadcast server for live broadcasting the video streaming media file on other mobile devices.

2. The method according to claim 1, wherein the operation of creating a video buffer based on the live broadcast command comprises:
    invoking a pre-configured mounting component based on the live broadcast command;
    replacing a picture loading method using the mounting component; and
    creating a corresponding video buffer based on the replaced picture loading method.

3. The method according to claim 2, wherein the operation of replacing a picture loading method using the mounting component comprise:
    detecting whether the picture loading method is invoked; and
    replacing a picture drawing method in the picture loading method when the picture loading method is invoked, so as to detect updating of the video picture frame by using the game engine.

4. The method according to claim 1, wherein the live broadcast server is configured to perform the live broadcasting by:
    receiving comment information associated with the video game from the other mobile devices;
    synthesizing the comment information and the video streaming media file, to obtain a live streaming media file with comments; and
    performing a broadcast operation on the live streaming media file with comments to the other mobile devices, wherein a respective mobile device is configured to display the comments from other mobile devices that are currently live broadcasting the video game.

5. The method according to claim 1, wherein the live broadcast server is configured to perform the live broadcasting by:
    receiving barrage comments information associated with the video game from the mobile devices;
    performing a broadcast operation on the video streaming media file; and
    synchronously superimposing the barrage comments information on the associated video picture frames of the video streaming media file on a playback screen of the terminal device.

6. A terminal device, comprising:
one or more processors;
memory coupled to the one or more processors; and
a plurality of programs stored in the memory that, when executed by the one or more processors, cause the terminal device to perform a live video broadcast method including:
   receiving a live broadcast command to live broadcast a video game in real time;
   creating a video buffer based on the live broadcast command for storing one or more game pictures of the video game in real time;
   while playing the video game in real time:
      detecting and extracting a plurality of video picture frames from the video game;
      storing the plurality of video picture frames in the video buffer;
      displaying the plurality of video picture frames in the video buffer on a display of the terminal device;
      collecting voice data using a microphone of the terminal device in real time;
      synchronously synthesizing the voice data and the plurality of video picture frames stored in the video buffer into a video streaming media file corresponding to the video game; and
      uploading the video streaming media file to a live broadcast server for live broadcasting the video streaming media file on other mobile devices.

7. The terminal device according to claim 6, wherein the operation of creating a video buffer based on the live broadcast command comprises:
   invoking a pre-configured mounting component based on the live broadcast command;
   replacing a picture loading method using the mounting component; and
   creating a corresponding video buffer based on the replaced picture loading method.

8. The terminal device according to claim 7, wherein the operation of replacing a picture loading method using the mounting component comprise:
   detecting whether the picture loading method is invoked; and
   replacing a picture drawing method in the picture loading method when the picture loading method is invoked, so as to detect updating of the video picture frame by using the game engine.

9. The terminal device according to claim 6, wherein the live broadcast server is configured to perform the live broadcasting by:
   receiving comment information associated with the video game from the other mobile devices;
   synthesizing the comment information and the video streaming media file, to obtain a live streaming media file with comments; and
   performing a broadcast operation on the live streaming media file with comments to the other mobile devices, wherein a respective mobile device is configured to display the comments from other mobile devices that are currently live broadcasting the video game.

10. The terminal device according to claim 6, wherein the live broadcast server is configured to perform the live broadcasting by:
   receiving barrage comments information associated with the video game from the mobile devices;
   performing a broadcast operation on the video streaming media file; and
   synchronously superimposing the barrage comments information on the associated video picture frames of the video streaming media file on a playback screen of the terminal device.

11. A non-transitory computer readable storage medium storing a plurality of instructions in connection with a terminal device, wherein the plurality of instructions, when executed by one or more processors of the terminal device, cause the terminal device to perform a live video broadcast method including:
   receiving a live broadcast command to live broadcast a video game in real time;
   creating a video buffer based on the live broadcast command for storing one or more game pictures of the video game in real time;
   while playing the video game in real time:
      detecting and extracting a plurality of video picture frames from the video game;
      storing the plurality of video picture frames in the video buffer;
      displaying the plurality of video picture frames in the video buffer on a display of the terminal device;
      collecting voice data using a microphone of the terminal device in real time;
      synchronously synthesizing the voice data and the plurality of video picture frames stored in the video buffer into a video streaming media file corresponding to the video game; and
      uploading the video streaming media file to a live broadcast server for live broadcasting the video streaming media file on other mobile devices.

12. The non-transitory computer readable storage medium according to claim 11, wherein the operation of creating a video buffer based on the live broadcast command comprises:
   invoking a pre-configured mounting component based on the live broadcast command;
   replacing a picture loading method using the mounting component; and
   creating a corresponding video buffer based on the replaced picture loading method.

13. The non-transitory computer readable storage medium according to claim 12, wherein the operation of replacing a picture loading method using the mounting component comprise:
   detecting whether the picture loading method is invoked; and
   replacing a picture drawing method in the picture loading method when the picture loading method is invoked, so as to detect updating of the video picture frame by using the game engine.

14. The non-transitory computer readable storage medium according to claim 11, wherein the live broadcast server is configured to perform the live broadcasting by:
   receiving comment information associated with the video game from the other mobile devices;
   synthesizing the comment information and the video streaming media file, to obtain a live streaming media file with comments; and
   performing a broadcast operation on the live streaming media file with comments to the other mobile devices, wherein a respective mobile device is configured to display the comments from other mobile devices that are currently live broadcasting the video game.

15. The non-transitory computer readable storage medium according to claim 11, wherein the live broadcast server is configured to perform the live broadcasting by:

receiving barrage comments information associated with the video game from the mobile devices;

performing a broadcast operation on the video streaming media file; and synchronously superimposing the barrage comments information on the associated video picture frames of the video streaming media file on a playback screen of the terminal device.

\* \* \* \* \*